(12) United States Patent
Yoshida

(10) Patent No.: US 6,381,700 B1
(45) Date of Patent: Apr. 30, 2002

(54) REMOTE NETWORK DEVICE FOR CONTROLLING THE OPERATION VOLTAGE OF NETWORK DEVICES

(75) Inventor: Fumiyoshi Yoshida, Osaka (JP)

(73) Assignee: Fukiko Yoshida, Osaka (JP)

( * ) Notice: Subject to any disclaimer, the term of this patent is extended or adjusted under 35 U.S.C. 154(b) by 0 days.

(21) Appl. No.: 09/110,323

(22) Filed: Jul. 6, 1998

(30) Foreign Application Priority Data

Jul. 7, 1997 (JP) ............................................. 9-181591

(51) Int. Cl.$^7$ ................................................ G06F 11/30
(52) U.S. Cl. ...................... 713/201; 713/202; 713/300; 713/310; 709/217; 709/222
(58) Field of Search ................................ 709/217, 218, 709/219, 222, 223, 243; 713/201, 202, 200, 340, 300, 310, 330

(56) References Cited

U.S. PATENT DOCUMENTS

| | | | |
|---|---|---|---|
| 5,404,544 A | * | 4/1995 | Crayford |
| 5,561,578 A | * | 10/1996 | Shimoyanogida ............ 361/91 |
| 5,856,789 A | * | 1/1999 | Huang |
| 5,938,742 A | * | 8/1999 | Faddell et al. .................. 710/9 |
| 6,038,595 A | * | 3/2000 | Ortony ........................ 709/218 |
| 6,108,300 A | * | 8/2000 | Coile et al. .................. 370/217 |

\* cited by examiner

*Primary Examiner*—Ario Etienne
(74) *Attorney, Agent, or Firm*—Armstrong, Westerman & Hattori, LLP

(57) ABSTRACT

A method and apparatus for enhancing computer security while controllably enabling online remote access for power-up to a computer at a far cite and also offering functions adaptable for communication protocols accommodating network architecture. To this end, a remote network device is provided which includes a switch module on the power supply line coupled to a CPU and to more than one personal computer (PC) hardware resource connected to the CPU. The switch module is operable to switch the operation voltages of the CPU and hardware resources. The device also includes a stand-by module on a signal transmit/receive line for use with the CPU and PC hardware resources in transmitting and receiving signals to and from external communication facility associated therewith. The standby module comes with its own drive power supply independent of the PC's power supply, and is normally rendered operative in any communication events. The standby module includes an identifier unit and controller. The identifier is for identifying one or both of ID data and password involved in an externally supplied signal to provide identification (ID) data. The controller is responsive to this ID data for controlling switching operations of the switch module.

5 Claims, 6 Drawing Sheets

REMOTE NETWORK DEVICE FOR CONTROLLING THE OPERATION VOLTAGE OF NETWORK DEVICES

FIELD OF THE INVENTION

The present invention relates generally to network apparatus for control of power-on/off of electrical equipment including digital computers, and more particularly to network devices adaptable for use in establishing local area network (LAN) connections between or among a plurality of computers associated.

BACKGROUND OF THE INVENTION

In the recent years certain hardware devices and software application software programs are commercially available which are capable of providing access to a remotely located computer at a far cite for causing a required software program prestored therein to get started or of transferring data files stored in such remote computer, such as for example an electronic-mail (E-mail) or document data. In such an event, however, any remote access to such computer is unachievable if the remote computer being accessed is rendered physically inoperative in the power-off state. More recently, advanced computers are commercially available from some leading companies, including IBM Japan Corp., which offer capabilities to remotely control power-on/off of any one of remote-cite computers by giving access thereto via public telephone communications links. Such computers of this type are remotely controllable in power-up/down in a way such that these are automatically rendered operative or "wake up" upon receipt of a certain signal such as encrypted number data via an associated telephone interconnect line. After power-up of these computers, any one of their "native" functions—typically, unmanned telephone answering, and automatic facsimile reception—become remotely controllable and then usable to users at remote cites.

Unfortunately, the approach to such enhanced usability based on the "wake-on LAN" architecture described above does not come without accompanying a penalty: as the connectivity of computers to the public telephone interconnect network increases upon receiving of remote-controlled "wake-up" requests, so does the chance for illicit access to such computers by unauthorized persons. As computers are increasingly employed in wide area networks including the "Internet", illicit access to office-use and/or home-use personal computers (PCs) increases in number. One approach for providing the security by protecting these computers against any unauthorized access attempts via communication links is to employ secure management of password data as required when giving access to target computers. Another approach is to install a security gateway unit generally called the "fire wall" at a selected "hub" location of the network infrastructure used.

However, the prior known remotely power-on/off controllable computers are inherently designed to merely accommodate automatic telephone answering and facsimile data reception functionalities, and thus are not aimed at accommodation of digital computer communications systems such as LANs or equivalents thereto. Hence, even where one "networked" computer is electrically powered on by the online remote control procedure, it still remains impossible to permit the intended software program stored therein to get started, or unattainable to send forth any intended E-mail or document file stored therein unless otherwise a special-purpose software program with specific functions of communications protocol adapted for use with the network is separately prepared and installed in such computer.

Another problem encountered with the prior art approaches lies in deficiency of security upon remote access to network computers. Most prior computers are designed so that all of their internal units or modules are not completely powered off in a wait or "sleep" mode prior to startup under remote control. A central processing unit (CPU) or microprocessor of each computer is set in sleep mode with reduced power dissipation. This means that the CPU is in the state waiting for reception of any possible signal input thereto, and thus can still consume certain amount of electrical power. This would result in unintentional permission for the CPU to be illicitly remote-accessed by unauthorized users, which in turn reduces the computer security.

It would be appreciated to those skilled in the computer art that there are no absolute or "ideal" schemes for perfectly preventing any possible unauthorized access to computers and networks. In such circumstances, an enhanced security system with multiple levels of security must be employed in order to reduce or minimize the risk of illicit access attempts by unauthorized users to network computers.

SUMMARY OF THE INVENTION

It is therefore an object of the present invention to increase the security of computers linked via communication lines while accompanying online power-on/off controllability for remotely located computers and also offering required functions adaptable for use with a chosen communication protocol in a communications network used.

To attain the foregoing object the present invention provides a remote network device operatively coupled to a microprocessor, more than one hardware resource connected to the microprocessor, a "main" power supply for supplying power to the microprocessor and hardware resource, and an external communication network. The device includes a switch module provided on a power supply line coupling the power supply to the microprocessor and the hardware resource, for performing a switching of the operation voltages of the microprocessor and the hardware resource. The device also includes a stand-by module disposed on a signal transmission line coupling the microprocessor and hardware resource to an external communications network. The standby module has its own drive power supply independent of the main power supply, and is normally rendered operative. The standby module is comprised of an identifier unit and a controller unit. The identifier is for identifying at least one of ID information and password information being added to a signal as received from the external communication network. The controller is operatively responsive to an identification result of the identifier, for controlling the switch module to thereby control the switching of the operation voltages.

In accordance with one aspect of the instant invention, the remote network device further includes a control unit responsive to an identification result of the identifier unit, for selectively switching the operation voltages of a plurality of hardware resources.

In accordance with another aspect of the invention, the stand-by module is operable to recognize operation voltages of the microprocessor and hardware resource in fixed time intervals, wherein the standby module comprises recognizer unit for controlling the switch module in deference to a recognition result to thereby control switching of the operation voltages, and transfer unit for externally transferring a recognition result of the recognizer.

In accordance with still another aspect of the invention, after turning on the operation voltages of the microprocessor and the hardware resource in response to a signal as received from the external communication network, ID information and password information are generated for addition to a transmission signal, which are different from one or both of the ID information and password information that have been added to the signal received.

In accordance with a further aspect of the invention, the remote network device preferably includes therein an encryption/decryption processing unit for encrypting a transmission signal being sent externally and for decrypting an encrypted signal received externally. This may prevent the contents of transmit/receive signals from being leaked to unauthorized persons.

In accordance with a yet further aspect of the invention, a network involves more than one or preferably a plurality of computers each of which has a built-in remote network device configured as stated supra.

These and other objects, features and advantages of the invention will be apparent from the following more particular description of preferred embodiments of the invention, as illustrated in the accompanying drawings.

DETAILED DESCRIPTION OF THE INVENTION

Figure 1:
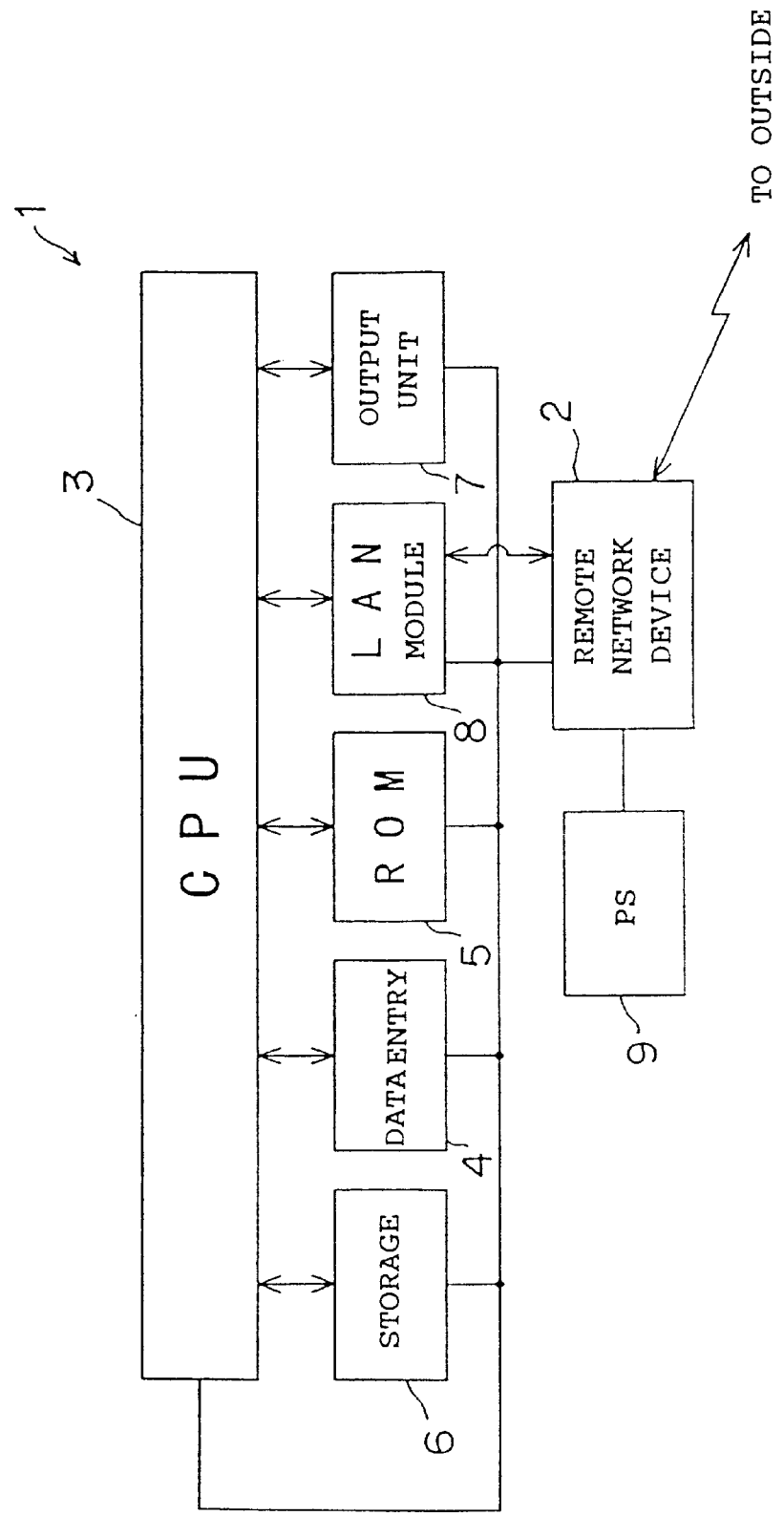
FIG. 1 is a block diagram showing a configuration of a computer system with a remote network device in accordance with the present invention being connected thereto.

Referring to FIG. 1, a personal computer (PC) system incorporating a remote network device 2 in accordance with one preferred embodiment of the invention is generally designated by reference numeral 1. The PC system 1 includes a CPU 3 and a variety of types of peripheral devices operatively associated therewith. The CPU 3 is designed to collectively execute software program tasks as input from such peripherals and various kinds of arithmetic processing and return execution results to an appropriate one or ones of the peripherals. The peripherals may illustratively include a data entry device 4 such as for example a hand-held locator called the "mouse" or keyboard or keypad, a rewritable digital storage element 5 which may be a "Flash" electrically erasable programmable read-only memory (Flash EEPROM), a storage device 6 with any medium for storing digital information such as a floppy diskette and hard disks, a data output device 7 such as for example a display unit and/or printer, and a LAN module 8 including, but not limited to, a modulator-demodulator (modem) and network PC adapter card, all of which are electrically connected to an internal power supply unit 9 that feeds them. In the preferred embodiment the remote network device 2 is operatively coupled to the LAN module 8 and power supply 9 as well as CPU 3, for switching or turn-on/off controlling the operation voltages of such components.

Figure 2:
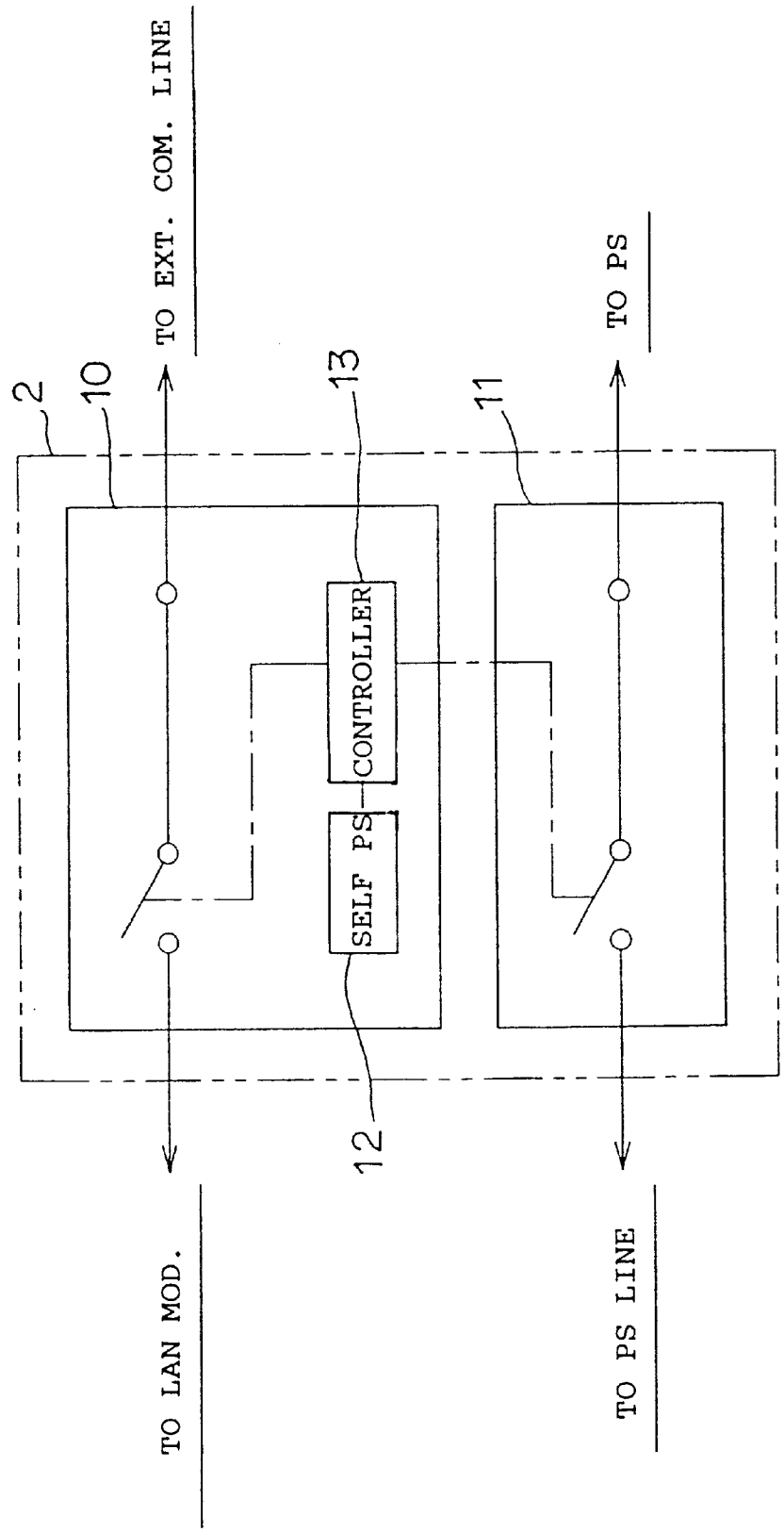
FIG. 2 is a diagram showing an internal configuration of the remote network device embodying the invention.

As shown in FIG. 2, the remote network device 2 installed within the PC system 1 includes a stand-by module 10 and switch module 11. The standby module 10 is operatively connected between the LAN module 8 of FIG. 1 and an external communication line associated therewith. The switch module 11 is between a power supply line or lines tied to the CPU 3 and peripherals 4–8 and the PC power supply 9 of FIG. 1. The standby module 10 is configured including a switch element as inserted into a LAN-module/external network connection line. Standby module 10 also includes its own drive power supply 12 independent of the PC power supply 9, and a controller unit 13 constantly supplied with power from drive power supply 12. This controller 13 is operable to monitor or "pilot" any signals as transmitted and received between the PC 1 and its associative external network resources. Controller 13 also functions to send a command signal to switch module 11, which signal is for instructing CPU 1 and peripherals 4–8 to turn on or off. Switch module 11 includes a switch that is responsive to receipt of the turn-on/off command from standby module 10 for forcing CPU 1 and peripherals 4–8 to turn on or off accordingly.

Figure 3:
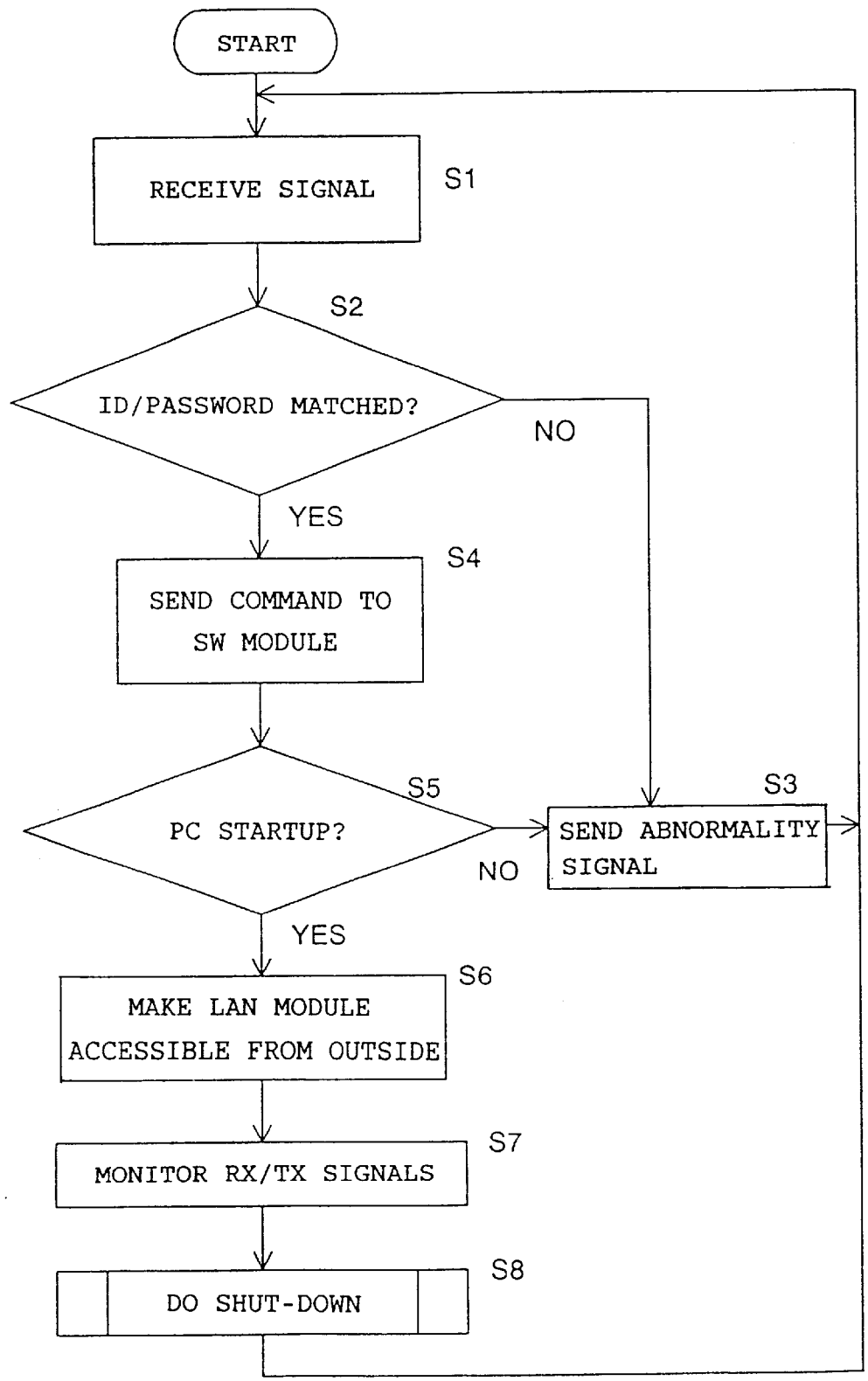
FIG. 3 is a flow diagram showing an online remote-controlled startup procedure of the computer system.

A conditional PC power-up/down remote control procedure of the remote network device 2 is shown in FIG. 3. Assume that all the components of PC system 1 other than the remote network devise 2 are in the power-off state for purposes of explanation only. Remote network device 2 alone remains operative with its own power supply 12 irrespective of whether PC 1 is turned on or off in a way such that the controller 13 of device 2 constantly monitors receipt of an input signal sent from an external network via a communication line coupled thereto. As shown in FIG. 3, the control procedure begins with step S1 which externally receives at the standby module 10 a start-up command signal with identification (ID) information and pre-registered password information being added thereto. Upon receipt of such startup command, the procedure goes to step S2 which permits the controller 13 to recognize the command and then compare for collation the ID and password information items with a listing of those IDs and passwords that have been prestored in Flash EEPROM 5. If "YES" at step S2, namely, if a match is found therebetween, then the procedure proceeds to step S4 which causes controller 13 to generate and pass a CPU/peripheral power-up command to the switch module 11. In response to this command, switch module 11 is rendered operative causing CPU 3 and peripherals 4–8 to turn on or "wake up." If "NO" at step S2, i.e. if a match is not found between input ID/password and prestored ones, then the procedure causes a branch to step S3 which permits CPU 3 to return an abnormality indication signal to the transmitter side—that is, the PC wakeup requester's equipment at a remote cite. Then, the procedure goes back to the initial "wait" state ready for receipt of another startup command signal as externally input to the remote network device 2 shown in FIG. 2.

Upon power up of the CPU 3 and peripherals 4–8 when the input ID and password are verified as correct codes at step S4, the CPU 3 first attempts to execute a task represented by a small program code set stored in a system ROM for initialization of peripherals 4–8. Then, CPU 3 executes required tasks represented by an initialize code set of a chosen operating system (OS) as prestored in a fixed or "hard" disk in storage unit 6. This is called the "booting" process. After completion of this boot process, the control procedure goes next to step S5 to determine whether the PC system 1 gets started correctly. If "YES" at step S5, i.e. when the expected boot-up was done correctly, the procedure enters step S6 which permits controller 13 to pass a connect signal to the LAN switch in standby module 10, connecting the external communication line to LAN module 8 of FIG. 1. Thus, controller 13 makes the PC system 1 accessible from the external communication line linked to public telephone communication networks. Thus, secure connectivity and accessibility is established between the requester's computer and the PC system 1 of FIG. 1. After startup of PC 1, the procedure is at step S7 whereat the controller 13 of standby module 10 constantly monitors real time incoming/outgoing data streams between the requester's external "master" computer and the "slave" PC 1. At step S8, upon receipt of a shut-down command signal from the master computer at a remote cite via the communication line, the controller 13 operates to perform an operation termination or "shut-down" routine processing for PC 1. When this shutdown processing is done, controller 13 is again set in a wait mode to get ready for reception of another externally supplied startup command signal. Note here that recommendable communication protocols for use in sending and receiving signals over communication lines may include, but not limited to, Transmission Control Protocol/Internet Protocol (TCP/IP), Internet Packet Exchange/Sequential Packet Protocol (IPX/SPX), AppleTalk™, and Point to Point Protocol (PPP).

The remote network device. 2 incorporating the principles of the invention ensures that the PC system 1 is "physically" forced in a power-off state rather than a remotely bootable state prior to electrical activation or power-on events thereof in a way such that the power supply 9 of PC 1 per se is turned off while electrically disconnecting to exclude the connectivity and accessibility of PC system 1 from the outside communication network resources via communication lines. This may advantageously serve to almost perfectly prevent any illicit accessing or "invasion" of internal hardware/software resources of PC 1 by unauthorized persons over external communications links.

It should be noted that while the illustrative embodiment is designed so that all of the CPU 3 and its associative peripherals 4–8 are powered up simultaneously upon inputting of an externally supplied startup command signal at the remote network device 2, the instant invention should not exclusively be limited thereto and may alternatively be arranged to employ a selective power up scheme for selectively supplying electrical power to CPU 3 and peripherals 4–8 so that only selected ones of them get started with the remaining one or ones rendered inoperative. By way of example, suppose that the PC wakeup requester at a remote cite does not require any data files on hard disks of the storage 6. If this is the case, it becomes possible by eliminating power up of the PC 1's hard disk drive (HDD), which thus remains inoperative, to reduce the risk of illicit data acquisition by unauthorized users, which in turn increases the computer security. Another example is that a higher level of priority is given to the authorization required for power up of a specific HDD that stores confidential information with a higher level of secrecy to thereby increase protectability to third party's easy accessing of the information. This may enable eliminate, or at least greatly suppress, erroneous erasure of such information while at the same time preventing information leakage to those persons with no authorization to log in the PC 1. Still another example is directed to the case the authorized user attempts to remotely log in PC 1 without the need to power up its display unit. In this case, use of the selective power up scheme may reduce or minimize power dissipation by permitting unnecessary peripheral devices to remain inoperative in remote log-in events.

Figure 4:
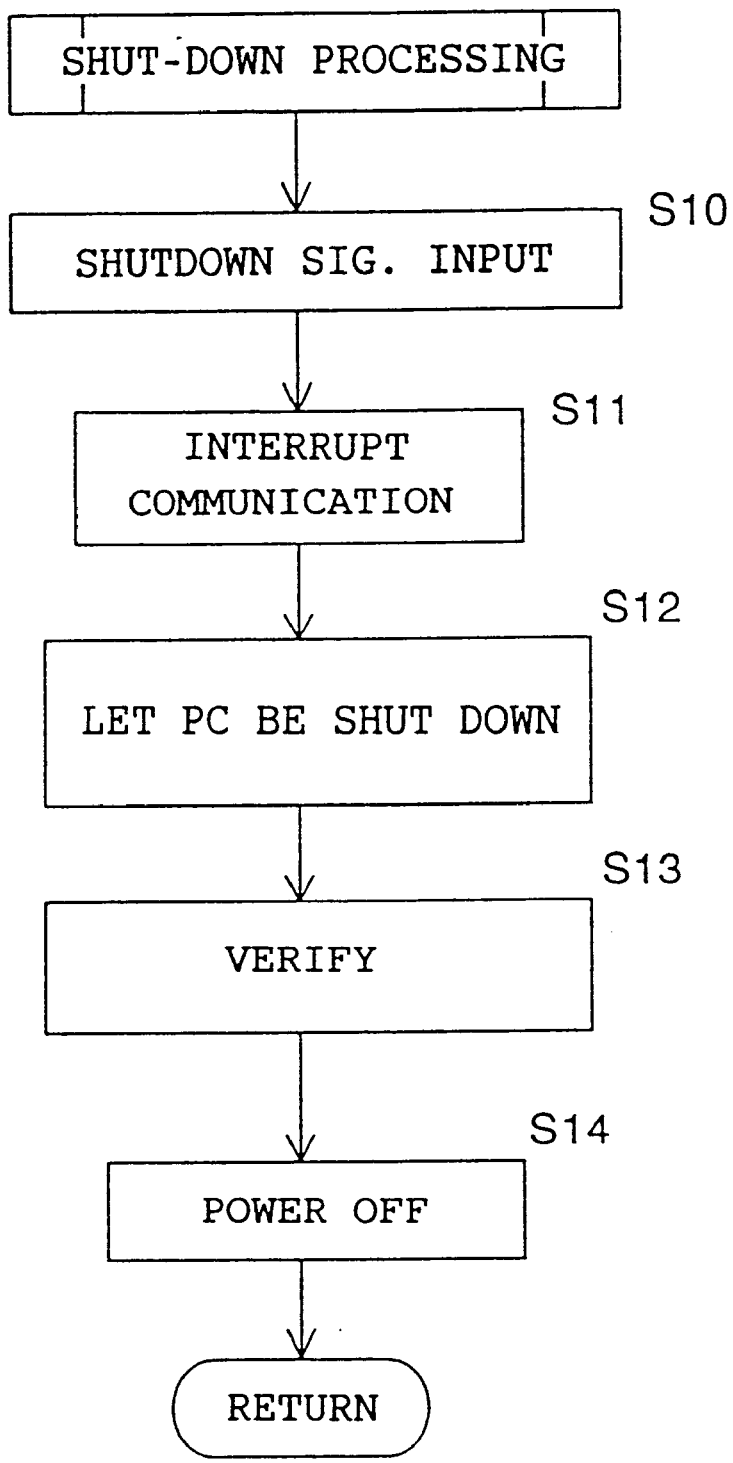
FIG. 4 is a flow chart showing a routine of shut-down of the computer system.

One typical routine of the shut-down processing in accordance with the invention is as follows. See FIG. 4. The shutdown routine begins with step S10 at which the remote network device 2 of FIG. 2 receives a shutdown command signal sent from the PC wakeup requester's computer at a remote cite via the outside communication line responsively coupled to the standby module 10. The routine goes next to step S11 which permits the controller 13 of standby module 10 recognizes this signal to cut off or interrupt communication paths to the outside communication resources. At step S12, controller 13 generates a shutdown command signal and passes it to CPU 3. In step S13 the controller 13 verifies completion of the intended shutdown of PC system 1. Thereafter, at step S14, controller 13 passes a power supply cutoff command to the switch module 11, which is responsive to such command for executing required tasks for disabling power supply to thereby render CPU 3 and peripherals 4–8 inoperative.

Figure 5:
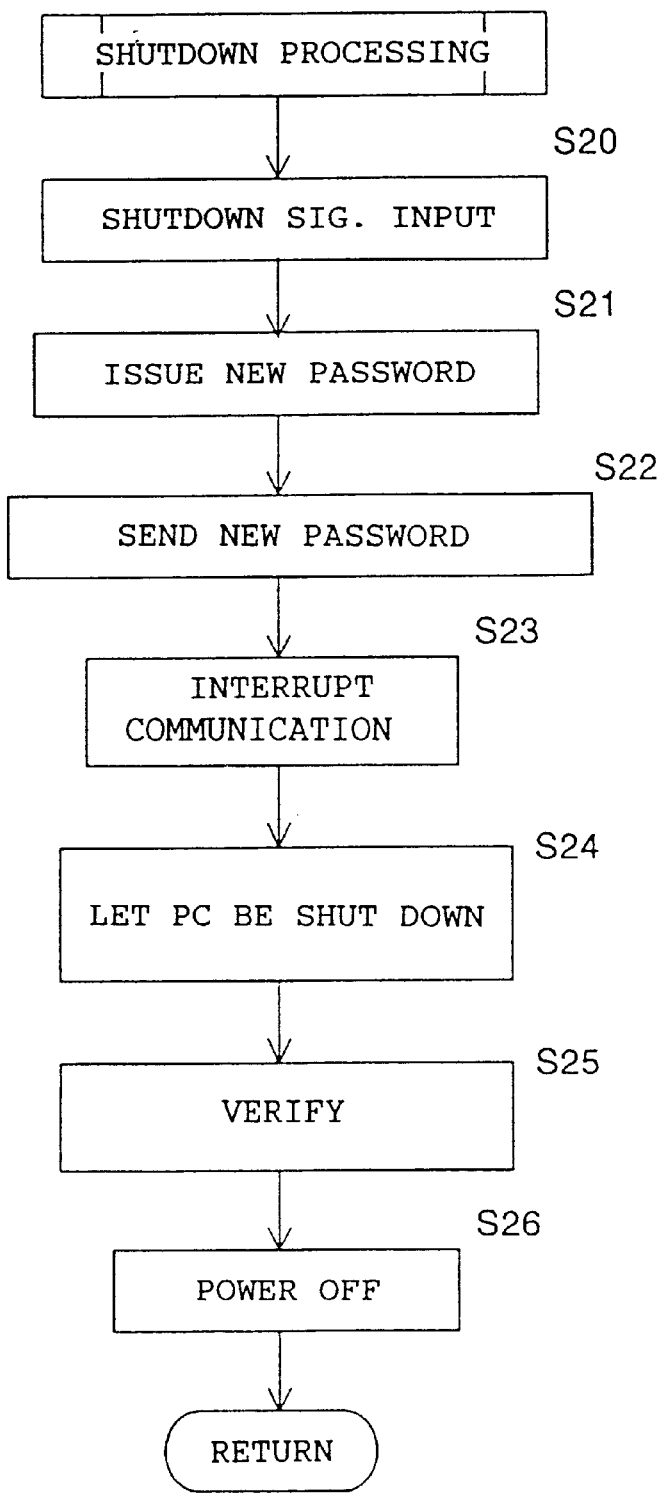
FIG. 5 is a flow chart showing another routine of shut-down of the computer.

Another recommendable routine of the power shutdown processing with enhanced security is exemplarily shown in FIG. 5. At step S20, the remote network device 2 receives an externally input shutdown command signal. At step S21 the controller 13 generates new password information; then, at step S22, controller 13 transmits it to the PC wakeup requester's computer. Simultaneously, controller 13 writes such updated password data into the Flash EEPROM 5 for replacement with its corresponding previous or "old" password information. In step S23 the controller 13 disables communication with outside communication resources. Then, at step S24, controller 13 passes a shutdown command to CPU 3. At step S25 the controller 13 affirms completion of the shutdown processing of PC 1. In step S26 the controller 13 generates and issues a CPU/peripherals powerdown command signal to the switch module 11. Switch module 11 in turn executes this instruction rendering CPU 3 and peripherals 4–8 inoperative in the absence of power supply thereto. With this scheme, new or updated password is established every time the requester attempts to log in the PC system 1 thus enhancing the security. In addition, although not depicted herein, the illustrative remote network device may be modified in configuration in a way such that its controller 13 additionally incorporates a specific module for use in encrypting and decrypting transmit/receive signals to thereby further increase the security. An encryption algorithm with a very high level of security to transmit data of high value as used herein may be a secret-key cryptosystem employing data encryption standard (DES) algorithm, or alternatively, a chosen public-key cryptosystem using for example Rivest-Shamir-Adelman (RSA) algorithm.

It is noted that the remote network device 2 may also include in function abnormality detectability for detecting any possible operation failure or malfunction in the PC system 1. During operations of the PC system 1, the controller 13 constantly monitors the system behavior in a way stated supra. More specifically, controller 13 functions to send a monitor signal to the CPU 3 in predefined time intervals. In responding thereto, CPU 3 verifies its own operation state and the status of a respective one of the peripheral units 4–8 shown in FIG. 1, then returning to controller 13 a status signal or signals indicative of the status thereof. This may enable, even where abnormal operations take place including excursion or run-away due to CPU's malfunction and application run-away as well as system operation failure/interruption due to accidental outage, the controller 13 to immediately detect occurrence of such operational abnormality thus sending an abnormality detection signal to the PC wakeup requester's computer at a remote cite over communications lines.

Figure 6:
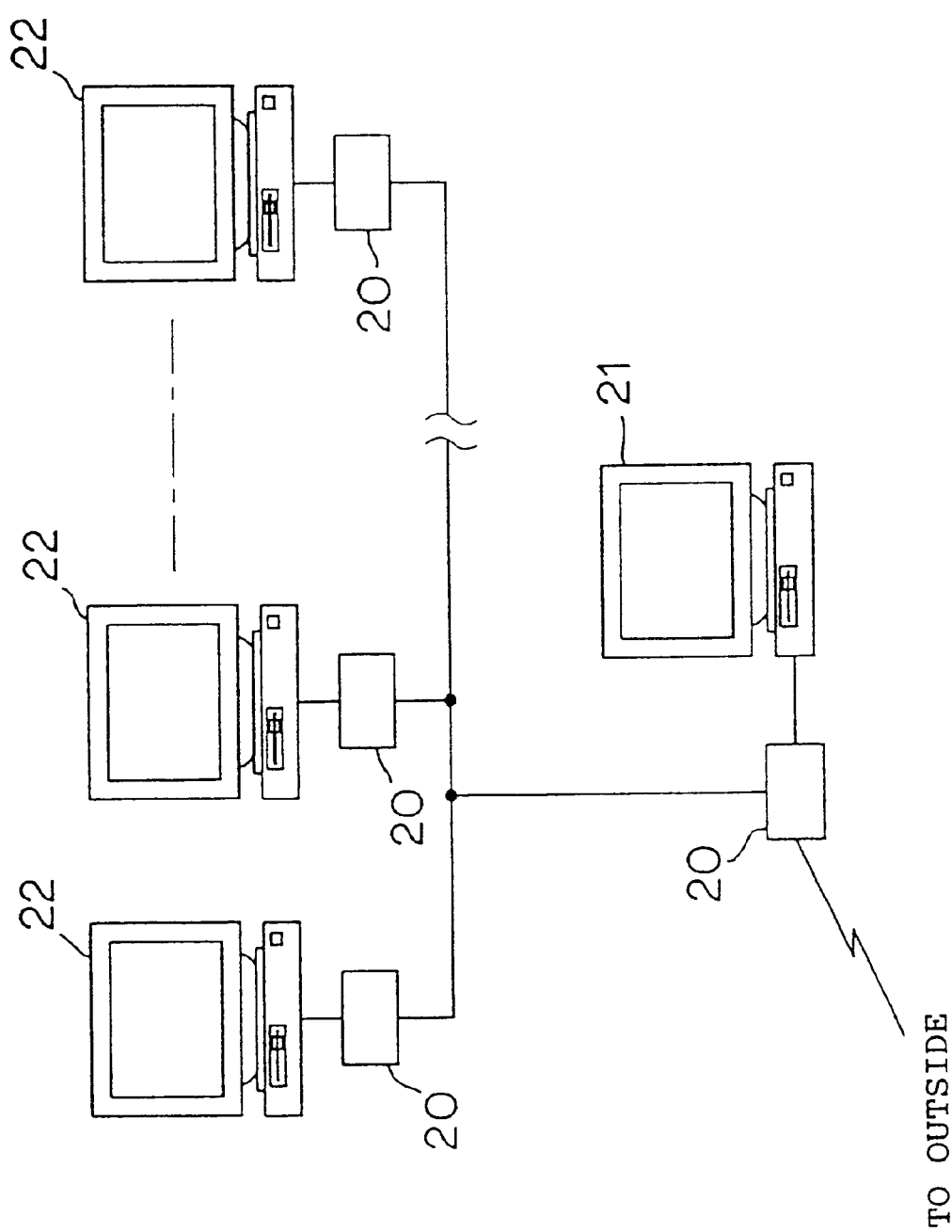
FIG. 6 is a pictorial representation of one exemplary network system including a plurality of operatively connected computer sets each incorporating the remote network device embodying the invention.

A computer network system employing more than one remote network device 20 in accordance with a further embodiment of the invention is shown in FIG. 6. In the illustrative embodiment the system may be client-server local area network (LAN) system, which includes multiple "client" PCs 22 operatively coupled to a "server" PC 21, each having a built-in remote network device 20 embodying the invention. These PCs 21, 22 are responsively coupled together via remote network devices 20 associated therewith, thereby permitting data transfer to be done therebetween via such devices 20. The server PC 21 is connected to an external communication system (not shown) via remote network device 20. Thus, it is permissible for registered users or subscribers, when they are out of their offices, to remotely control power up or "wakeup" of any desired one of client PCs 22 to provide remote access thereto through server PC 21. Accordingly, as far as the user is in communicable circumstances with capability of remote log-in to the network shown in FIG. 6, it is possible for the user to remotely control power up of his or her PC for access thereto regardless of how far the user is from his or her company with the FIG. 6 network. In addition, unnecessary work data distribution may be eliminated because any required part of those data files presently stored in his or her own office-use PC is made available for update at any time and anywhere on a real time basis. This may permit the user to avoid the need for hand-carrying a portable or handheld mobile computer set, such as for example a notebook or palm-top computer.

It is noted that in the case of the PC system, its CPU or microprocessor (MPU) chip set is typically mounted on a single printed circuit board called the "mother board" along with some essential electronics components or modules including, but not exclusively limited to, system memory chips and a ROM for storage of a basic input output system (BIOS) codes as well as expansion slots. In this respect, the remote network device embodying the invention may alternatively be implementable in the form of a credit card-sized expansion device insertable into a selected slot for interconnection to either industry standard architecture (ISA) bus or peripheral component interconnect (PCI) bus. Still alternatively, the remote network device is usable in form of an expansion device accommodating the universal serial bus (USB) standards.

Further, the remote network device embodying the invention may also be implemented in a way such that it is connected to appropriate network equipment such as for example a terminal adapter (TA), router, hub or the like. In such case, it becomes possible for authorized users to remotely control power-up/down of these network terminals, which may in turn enable adaptive control of the right of access to remote network resources through such terminals.

Furthermore, the remote network device embodying the invention may also be built in factory automation (FA) systems. In general circumstances employing the FA architecture, terminal units used are in many cases under severe conditions—high in temperature, high humidity, much contaminants in the air, and/or increased vibrations. Installing in the individual FA equipment the remote network device embodying the invention for interconnection with others makes it possible to let one remote network device promptly sense any accidental operation failure at its associated FA equipment then forwarding a corresponding abnormality detection signal to one or several of the remaining "networked" FA equipment or terminals. This may enable, where a plurality of FA terminals are operatively associated together to execute a serious of the intended tasks by way of example, unwanted expansion of damages originated from such single terminal to the others.

It has been described that the invention provides a remote network device which is placed on a power line coupling the "main" power supply to a microprocessor and its associative hardware resources and also on a signal transmission path for connection of the microprocessor and hardware resources to an external communication network, and which includes a switch module for switching the operation voltages of the microprocessor and hardware resources along with a standby module that has its own "subsidiary" drive power supply independent of the main power supply to be constantly rendered operative in any events. The standby module includes an identifier unit operable to identify one or the both of the ID information and password information as included in a received signal sent from the external network. The standby module also includes a controller unit which is responsive to an identification result of the standby module, for controlling switching operations of the switch module to likewise control the operation voltage switching. With such an arrangement, it becomes possible to prevent any illicit access or "invasion" to computer systems and/or computer networks by unauthorized persons with no registered IDs and passwords, thus increasing or maximizing the computer security. Another advantage of the invention lies in a decrease in power dissipation. This can be said because the computer systems are forced in the power-down state during no access attempts.

Another feature of the invention is that the standby module includes a recognizer operable to recognize the operation voltages of the microprocessor and hardware resources every time a specified time is elapsed and controls the switch module in accordance with a recognition result to thereby appropriately control the operation-voltage switching operation, and a transmitter for externally sending forth the recognition result available from the recognizer. With such an arrangement, when abnormal operations occur including excursion or run-away due to CPU's malfunction and application software's run-away as well as system operation failure/interruption due to accidental power outage, it is possible to successfully detect occurrence of such abnormal events and promptly notify a transmitter side of presence of such failure.

A further feature of the invention is that after power up of the microprocessor and hardware resources in response to a specified signal as externally supplied from an outside communication network, one or the both of the ID information and password information added to the received signal are replaced with new or updated information items different therefrom, which are then added to an externally transmitted signal. This may in turn permit updating of the "old" ID and password to new ones thus increasing the computer system security.

A still further feature of the invention is that the remote network device includes an encryption/decryption processor for encrypting an externally transmitted signal while decrypting an externally received signal, thereby enabling the contents of transmit/receive signals to be kept secret from any unauthorized users.

A yet further feature of the invention lies in constituting a network system which includes computers each having a built-in remote network device of the type stated supra, thus making it possible to remotely control from the outside any desired one of them to power up or "wake on."

Although the invention has been disclosed and illustrated with reference to a particular embodiment, the principles involved are susceptible for use in numerous other embodiments which will be apparent to persons skilled in the art. The invention is, therefore, to be limited only as indicated by the scope of the appended claims.

What is claimed is:

1. A remote network device operatively coupled to a microprocessor, a plurality of hardware resources connected to the microprocessor, a power supply for supply power to the microprocessor and said plurality of hardware resources, and an external communication network, wherein the remote network device is placed on a power supply path connecting between the power supply and both of said microprocessor and said plurality of hardware resources and also on a signal transmission path connecting said microprocessor and said plurality of hardware resources to the external communication network, and the device includes a switch module for performing switching of an operation voltage of said microprocessor and said plurality of hardware resources, and a stand-by module having a drive power supply independent of said power supply and normally remaining operative, said stand-by module comprising identifier means for identifying at least one of an ID information and a password information being added to a signal as received from said external communication network, and control means operatively responsive to an identification result of said identifier means for controlling said switch module to thereby control the switching of said operation voltage, wherein after turning on the operation voltage of said microprocessor and said plurality of hardware resources in response to a signal as received from the external communication network, ID information and password information are generated for addition to a transmission signal, which are different from one or both of the ID information and password information added to said signal received.

2. The remote network device according to claim 1, further comprising encryption demodulator means for encrypting a transmission signal sent externally and for decrypting an encrypted signal received externally.

3. A network system including at least one computer with the remote network device built therein according to claim 1.

4. A remote network device operatively coupled to a microprocessor, a plurality of hardware resources connected to the microprocessor, a power supply for supply power to the microprocessor and said plurality of hardware resources, and an external communication network, wherein the remote network device is placed on a power supply path connecting between the power supply and both of said microprocessor and said plurality of hardware resources and also on a signal transmission path connecting said microprocessor and said plurality of hardware resources to the external communication network, and the device includes a switch module for performing switching of an operation voltage of said microprocessor and said plurality of hardware resources, and a stand-by module having a drive power supply independent of said power supply and normally remaining operative, said stand-by module comprising identifier means for identifying at least one of an ID information and a password information being added to a signal as received from said external communication network, and control manes operatively responsive to an identification result of said identifier means for controlling said switch module to thereby control the switching of said operation voltage, further comprising control means response to an identification result of said identification means for selectively switching operation voltage of said plurality of hardware resources, wherein after turning on the operation voltage of said microprocessor and said plurality of hardware resources in response to a signal as received from the external communication network, ID information and password information are generated for addition to a transmission signal, which are different from one or both of the ID information and password information added to said signal received.

5. A remote device operatively coupled to a microprocessor, a plurality of hardware resources connected to the microprocessor, a power supply for supply power to the microprocessor and said plurality of hardware resources, and an external communication network, wherein the remote network device is placed on a power supply path connecting between the power supply and both of said microprocessor and said plurality of hardware resources and also on a signal transmission path connecting said microprocessor and said plurality of hardware resources to the external communication network, and the device includes a switch module for performing switching of an operation voltage of said microprocessor and said plurality of hardware resources, and a stand-by module having a drive power supply independent of said power supply and normally remaining operative, said stand-by module comprising identifier means for identifying at least one of an ID information and a password information being added to a signal as received from said external communication network, and control means operatively responsive to an identification result of said identifier means for controlling said switch module to thereby control the switching of said operation voltage, wherein said stand-by module is operable to recognize the operation voltage of said microprocessor and said plurality of hardware resources in constant time intervals, and wherein said stand-by module comprises recognition means for controlling said switch module in accordance with a recognition result to control switching of said operation voltage, and transfer means for externally transferring a recognition result of said recognition means, wherein after turning on the operation voltage of said microprocessor and said plurality of hardware resources in response to a signal as received from the external communication network, ID information and password information are generated for addition to a transmission signal, which are different from one or both of the ID information and password information added to said signal received.

* * * * *